(12) United States Patent
Fang (10) Patent No.: US 10,640,187 B2
(45) Date of Patent: *May 5, 2020

(54) FLYING UNDERWATER IMAGER WITH MULTI-MODE OPERATION FOR LOCATING AND APPROACHING UNDERWATER OBJECTS FOR IMAGING AND MAINTAINING DEPTHS AND ALTITUDES

(71) Applicant: Li Fang, Los Altos, CA (US)

(72) Inventor: Li Fang, Los Altos, CA (US)

( * ) Notice: Subject to any disclaimer, the term of this patent is extended or adjusted under 35 U.S.C. 154(b) by 41 days.

This patent is subject to a terminal disclaimer.

(21) Appl. No.: 16/054,923

(22) Filed: Aug. 3, 2018

(65) Prior Publication Data

US 2018/0339756 A1 Nov. 29, 2018

Related U.S. Application Data

(63) Continuation-in-part of application No. 15/376,680, filed on Dec. 13, 2016, now Pat. No. 10,065,715.

(60) Provisional application No. 62/372,619, filed on Aug. 9, 2016.

(51) Int. Cl.
| | |
|---|---|
| *B63G 8/00* | (2006.01) |
| *B63G 8/42* | (2006.01) |
| *B63G 8/39* | (2006.01) |
| *H04N 5/232* | (2006.01) |
| *B63G 8/38* | (2006.01) |
| *B63B 21/66* | (2006.01) |

(52) U.S. Cl.
CPC ............... *B63G 8/001* (2013.01); *B63G 8/38* (2013.01); *B63G 8/39* (2013.01); *B63G 8/42* (2013.01); *H04N 5/23203* (2013.01); *H04N 5/23299* (2018.08); *B63B 21/66* (2013.01); *B63G 2008/007* (2013.01)

(58) Field of Classification Search
CPC . B63G 8/001; B63G 8/39; B63G 8/42; B63G 8/38; B63G 2008/007; B63B 21/66; B63B 2722/00
See application file for complete search history.

(56) References Cited

U.S. PATENT DOCUMENTS

| | | |
|---|---|---|
| 3,092,060 A | 6/1963 | Reid |
| 4,350,111 A | 9/1982 | Boyce, II |
| 6,089,178 A | 7/2000 | Yamamoto et al. |
| 7,752,988 B2 | 7/2010 | Axford |

(Continued)

FOREIGN PATENT DOCUMENTS

JP 61-259119 * 11/1986

*Primary Examiner* — Michael J Zanelli
(74) *Attorney, Agent, or Firm* — Law Office of Dorian Cartwright; Dorian Cartwright (57) ABSTRACT

A flying underwater imager device operates in two modes, a tow mode and a free fly mode. In the tow mode for locating underwater objects, the imager device opens foldable wings for remaining depressed below the surface when the wings generate a negative buoyancy. Otherwise, neutral buoyancy characteristics bring the imager device back to surface. In the free fly mode for approaching and imaging underwater objects, the imager device closes the foldable wings and uses thrusters for moving into position to image the underwater objects. The flying underwater imager device can be maintained or moved to a desired depth below a surface or height above a sea bed.

8 Claims, 8 Drawing Sheets

(56) References Cited

U.S. PATENT DOCUMENTS

| | | | |
|---|---|---|---|
| 7,900,571 B2 * | 3/2011 | Jaber | B63B 22/18 |
| | | | 114/245 |
| 2005/0066872 A1 | 3/2005 | Geriene et al. | |
| 2008/0203216 A1 | 8/2008 | Apeloig et al. | |
| 2009/0211509 A1 | 8/2009 | Olivier et al. | |
| 2011/0226174 A1 | 9/2011 | Parks | |
| 2012/0180712 A1 | 7/2012 | Vosburgh et al. | |
| 2012/0289103 A1 | 11/2012 | Hudson et al. | |
| 2012/0312221 A1 | 12/2012 | Vosburgh | |
| 2017/0261629 A1 * | 9/2017 | Gunnarsson | G01V 3/081 |

\* cited by examiner

Figure 1A:
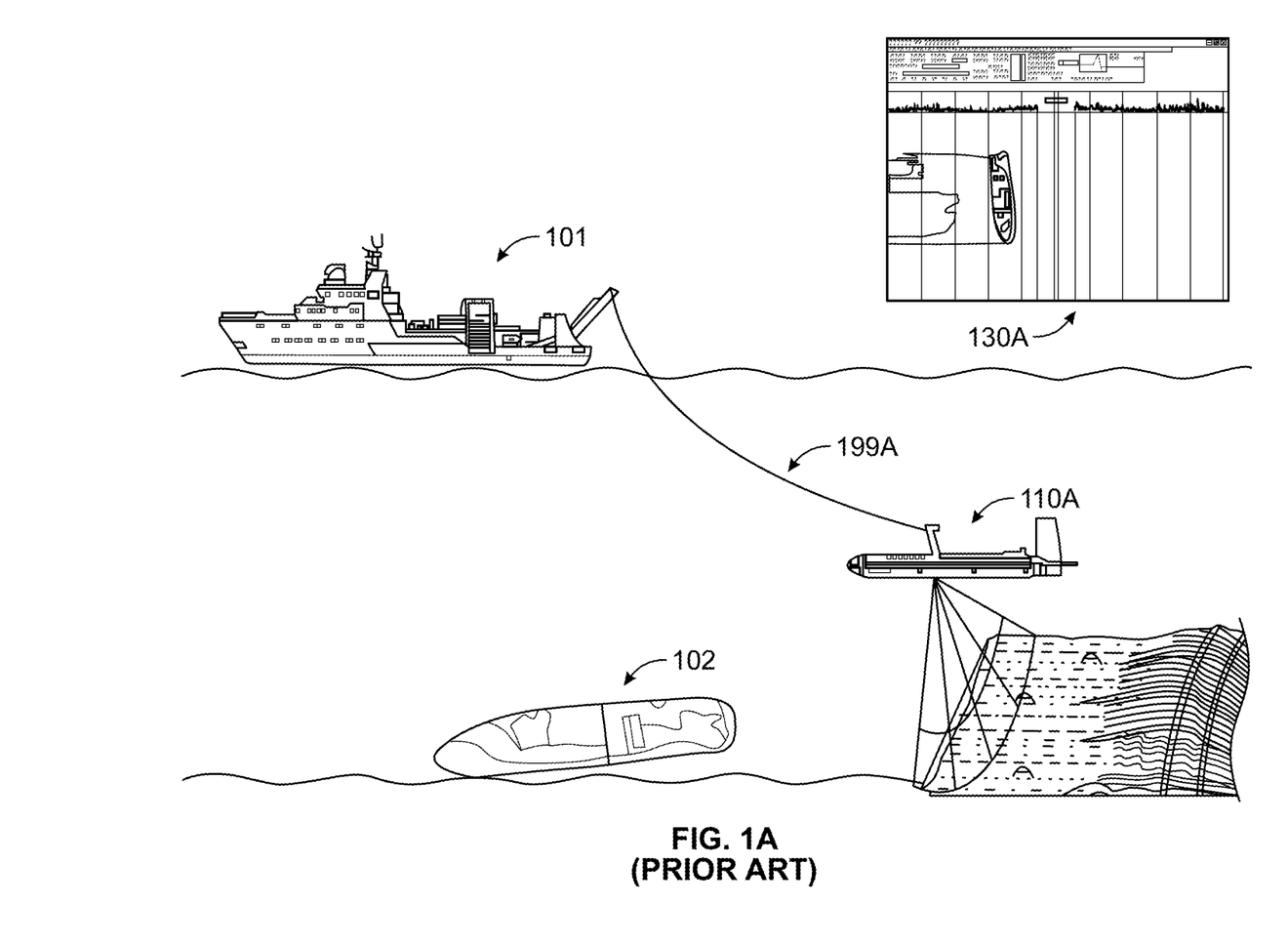
FIG. 1A is a schematic diagram illustrating a scan sonar transducer, according to the prior art.
Figure 1B:
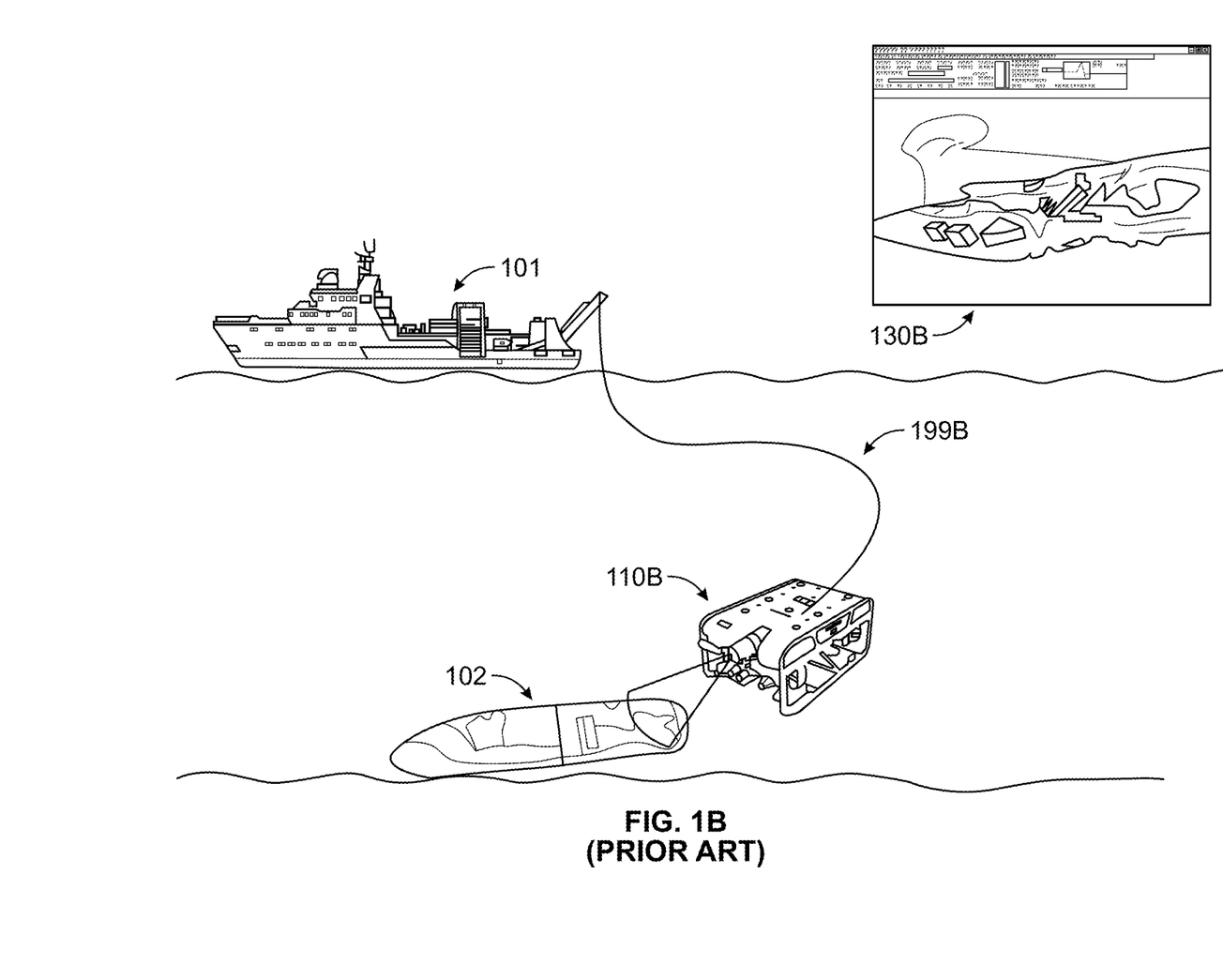
FIG. 1B is a schematic diagram illustrating an ROV, according to the prior art.

FIG. 6 ated on limited real estate of the tow boat 101. Furthermore, the negative buoyancy of the sonar transducer 110A is mutually exclusive to the neutral buoyance of the ROV 110B.

An additional problem occurs in the context of water quality monitoring and testing. Currently, research of how water quality varies at different depths and locations requires stopping at multiple locations. Each stop is needed for deployment of a water sample collector. It is lowered to a certain depth and retrieved.

Therefore, what is needed is a robust new device, such as a flying underwater imager with multi-mode operation for locating and approaching underwater objects for imaging. The device should automatically adjust flying depths in autopilot mode.

FLYING UNDERWATER IMAGER WITH MULTI-MODE OPERATION FOR LOCATING AND APPROACHING UNDERWATER OBJECTS FOR IMAGING AND MAINTAINING DEPTHS AND ALTITUDES

CROSS-REFERENCE TO RELATED APPLICATIONS

This application claims the benefit of priority as a continuation-in-part application under 35 U.S.C. 120 to U.S. application Ser. No. 15/376,680, filed Dec. 13, 2016, entitled FLYING UNDERWATER IMAGER WITH MULTI-MODE OPERATION FOR LOCATING AND APPROACHING UNDERWATER OBJECTS FOR IMAGING, which in turn claims the benefit of priority under 35 U.S.C. 119(e) to U.S. Application No. 62/372,619, filed Aug. 9, 2016, entitled REMOTELY OPERATED VEHICLE WITH SWITCHABLE DEPRESSED TOW AND FREE FLY MODES, by Li Fang, the contents of which are hereby incorporated by reference in its entirety.

FIELD OF THE INVENTION

The invention relates generally to underwater devices, and more specifically, a flying underwater imager with multi-mode operation for locating and approaching underwater objects for imaging, and for maintaining depths below a surface or altitude above a sea bed.

BACKGROUND

Exploration ships deploy underwater equipment to investigate underwater objects. For example, FIG. 1A is a schematic diagram illustrating a scan sonar transducer (or tow fish) 110A being pulled by a tow boat 101, according to conventional technology. The sonar transducer 110A uses long-range technology such as echo location to identify objects of interest. A weighted tow line 199A keeps the sonar transducer 110A submerged for echo location operation which can be surfaced by movement of the tow boat 101. A negative buoyancy of the sonar transducer 110A also contributes to submersion.

Once an object 102 of interest is identified for investigation, the sonar transducer 110A is hauled back to the tow boat 101, disconnected form the tow line 199B, and replaced with a remotely operated vehicle (ROV) 110B, as shown in FIG. 1B. The tow line 199B is typically switched out to allow neutral buoyancy for navigation, as well because the data line for the ROV 110B is different from the data line of the sonar transducer 110A, and focus is on data transfer rather than weighting the sonar transducer 110A. The object 102 is shown as an object of interest in low quality sonar images 130A in a display device but the sonar transducer 110A is not equipped with auto-pilot and imaging devices necessary to investigate the object 102. On the other hand, the ROV 110B can display high quality images 130B, but is not adapted for travel at higher speeds and does not have long range recognition capabilities.

Problematically, the conventional transition process can take an hour or so, and once investigation is complete, the reverse deployment is necessary to continue sonar exploration. A dynamic object, such as a body that is not tied into the terrain, may be relocated by water currents by the time the ROV 110B is deployed to the coordinates. This can lead to hesitation for deployment and less thorough investigations. Moreover, the multiple devices are stored and main-

SUMMARY

The above-mentioned shortcomings are addressed by systems, methods, and non-transitory source code for a flying underwater imager with multi-mode operation for locating and approaching underwater objects for imaging. In another embodiment, a flying underwater imager maintains or moves to a certain depth below a surface and/or maintains or moves to a certain height above a sea bed.

In one embodiment, a flying underwater imager device operate in two modes, a tow mode and a free fly mode. In the tow mode for locating underwater objects, the imager device opens foldable wings for remaining depressed below the surface with negative buoyancy. Otherwise, neutral buoyancy characteristics bring the imager device back to surface. In the free fly mode for approaching and imaging underwater objects, the imager device closes the foldable wings and uses thrusters for moving into position. As a result, negative buoyancy is generated by the wings during motion but gives way to neutral buoyancy when slowing or stopping the motion.

An additional embodiment includes an auto-pilot mode for the flying underwater imager device. In the auto-pilot mode, depths and heights are adjusted or maintained. Thrusters move the image device into position. Due to currents, thrusters may be needed just to maintain a position.

In yet another embodiment, an updated value for a depth is received. In response, the velocity of a towing device can be adjusted to change a current depth. Also in response, a tow line can be released or contracted to change a current depth. One instance combines velocity with tow length adjustments to reach a new depth.

Advantageously, a single new type of device with a single deployment saves time, expense, manual labor, and space when imaging underwater objects. Objects of interest identified by a long-range radar can be immediately investigated close up with a video feed.

BRIEF DESCRIPTION OF THE FIGURES

In the following figures, like reference numbers are used to refer to like elements. Although the following figures depict various examples of the invention, the invention is not limited to the examples depicted in the figures.

DETAILED DESCRIPTION

The disclosure provides devices, and related methods, non-transitory source code for a flying underwater imager with multi-mode operation for locating and approaching underwater objects for imaging.

Figure 2A:
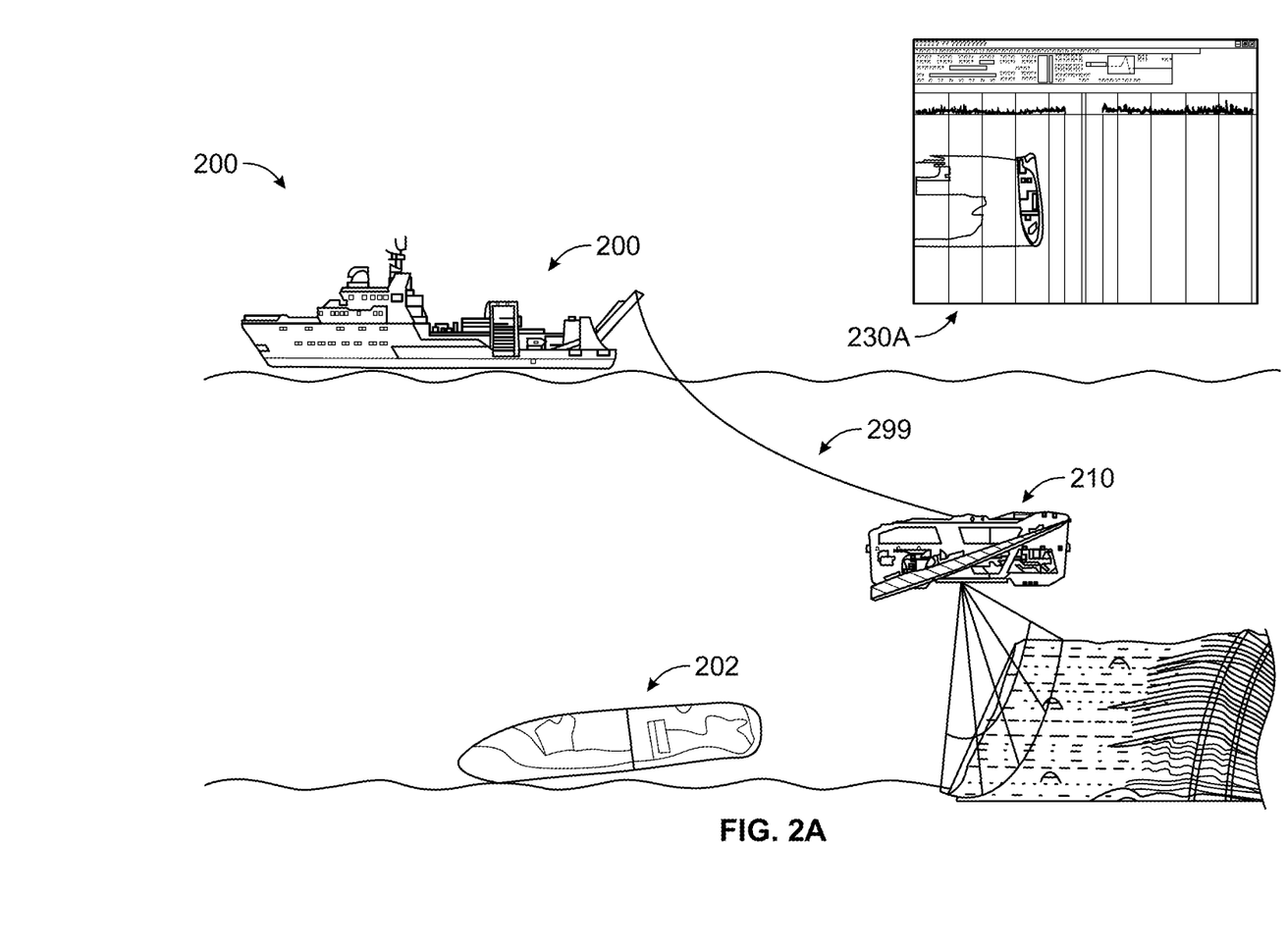
FIG. 2A is a schematic diagram illustrating a flying underwater imager in a tow mode for target identification, according to an embodiment.

FIG. 2A is a schematic diagram illustrating a flying underwater imager 210 in a tow mode for target identification, according to an embodiment. An underwater imaging environment 200 include a tow boat 201, the flying underwater imager 210, and an underwater object 202. Other variations are possible, such as multiple flying underwater flying imagers, multiple underwater objects, and alternative underwater terrains. By contrast, FIG. 2B illustrates a free flying mode for approaching and imaging selected underwater objects.

In the tow mode of FIG. 2A, the tow boat 201 hauls the flying underwater imager 210 at a certain speed. The underwater object 202 is sonar-imaged as displayed 230A on a display device located on a computer on deck of the tow boat 201. In the unfolded and angled wing position, a depressing force of negative buoyancy is generated in combination with thrust of the tow boat 201 to counteract a neutral buoyancy inherent in the flying underwater imager 210. Thus, a weighted cable is not necessary for maintaining submersion.

Figure 2B:
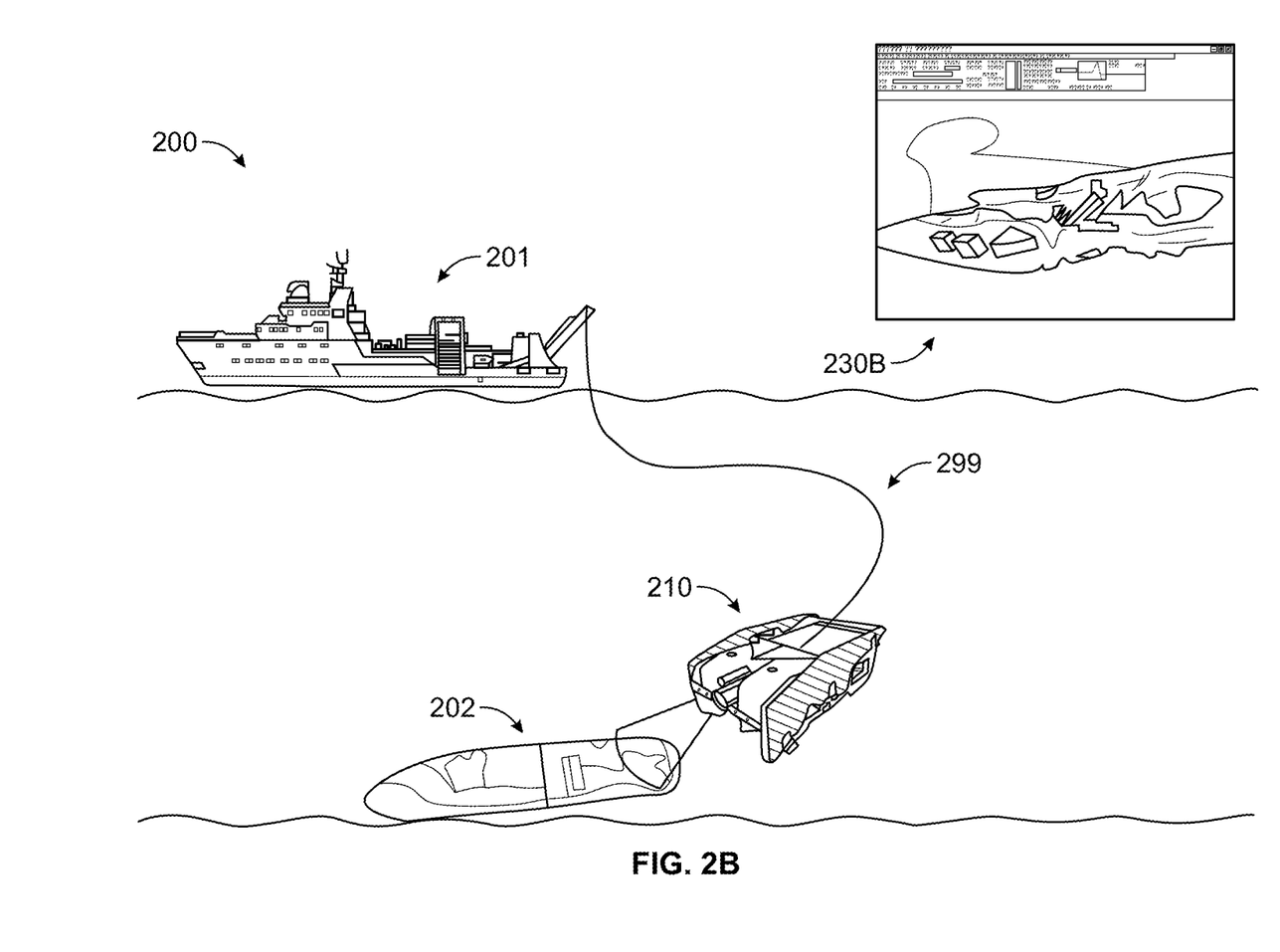
FIG. 2B is a schematic diagram illustrating the flying underwater imager of FIG. 2A in a free fly mode for target approach and imaging, according to an embodiment.

In free flying mode of FIG. 2B, the tow boat 201 can come to a stop or slow down. Additional length can also be released on the tow line 299A to accommodate movement by the flying underwater imager 210. An auto-pilot or remote controlled navigation closes the distance to investigate the underwater object 202. The flying underwater imager 210 reaches a close to the underwater object 202 and begins taking pictures or streaming video in higher resolution 230B.

In autopilot mode, the flying underwater imager 210 can be maintained or moved to a certain depth from a surface. In another embodiment, the flying underwater imager 210 can maintained or moved to a certain height from a sea bed. In still another embodiment, auto-tracking automatically moves the flying underwater imager 210 to a certain location, such a an underwater object.

A tow line 299B is a communication medium for data transfer between a computer on the tow boat 201 and a computer onboard the flying underwater imager 210. For example, a twister pair conducts data transmission using Ethernet protocols. The tow line 299B connects to a tow bar that is rigid and appropriately strong.

Figure 3:
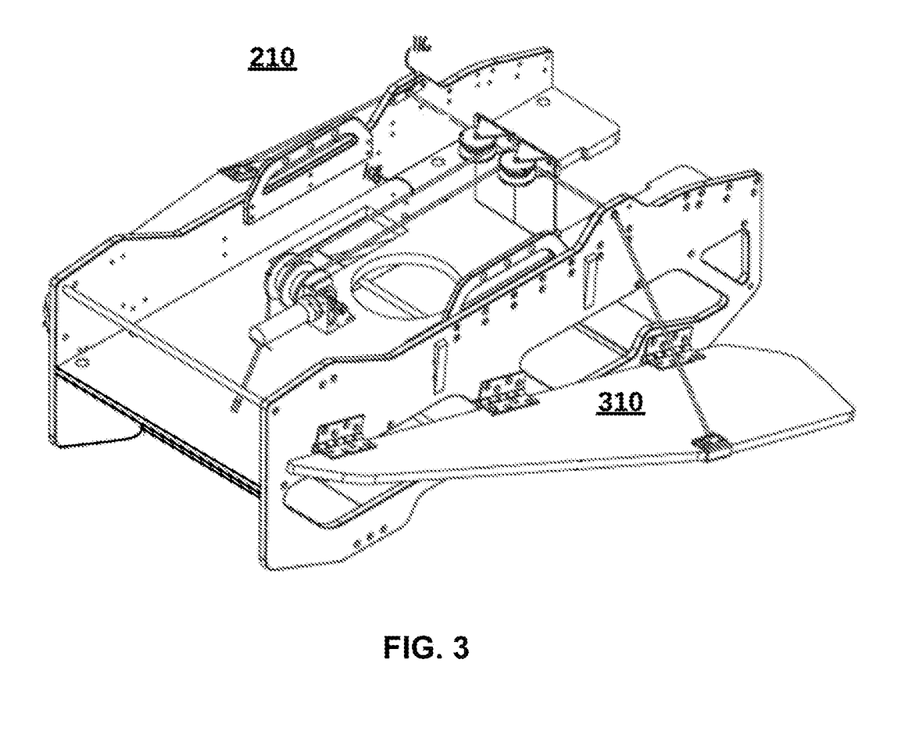
FIG. 3 is a perspective view of the flying underwater imager in the tow mode with wings unfolded, according to an embodiment.

FIG. 3 is a perspective view of the flying underwater imager 210 in the tow mode with wings 310 unfolded, according to an embodiment. A pulley system extended to allow cordage used to keep wings 310 folded, to lengthen and open hinges attaching the wings 310 to a frame. Extended wings, at a certain angle, translate thrust of a tow boat into downward pressure on the flying underwater imager 210 to stay below the surface.

Figure 4A:
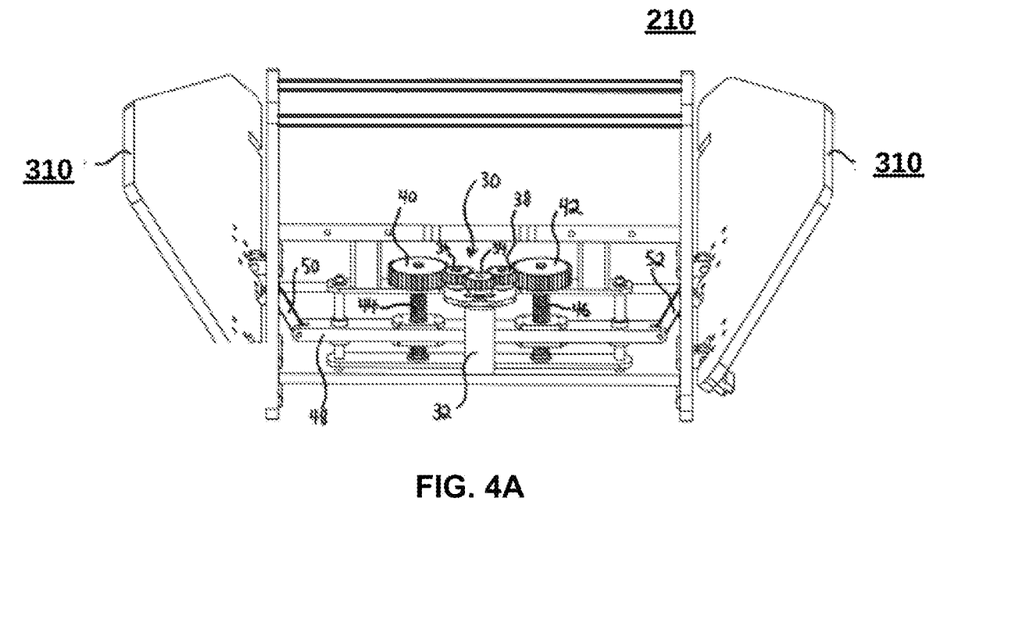
FIGS. 4A-4B are various perspective views of the flying underwater imager in the free fly mode with wings folded, according to some embodiments.
Figure 4B:
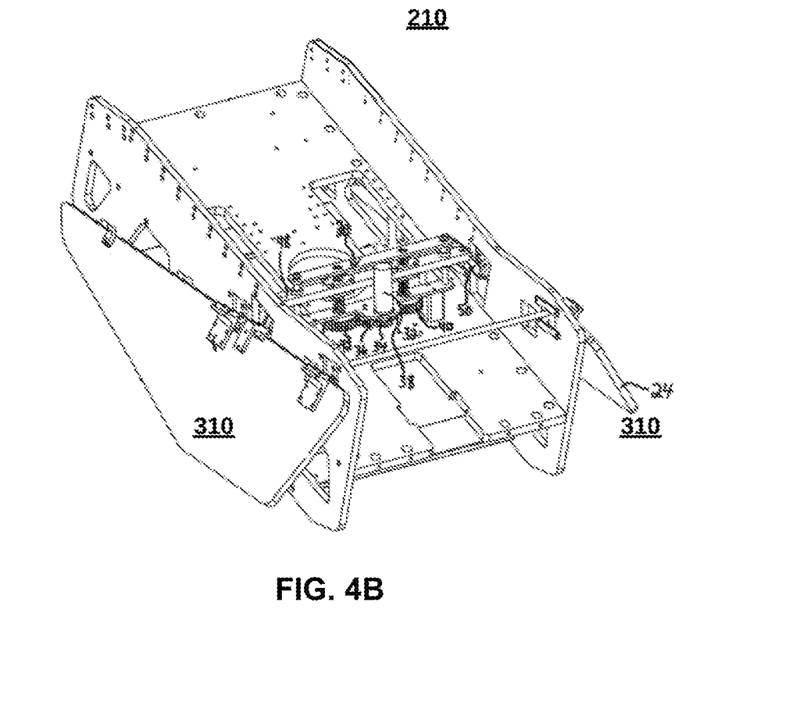

By contrast, FIG. 4 shows the underwater imager 210 with cordage retracted to fold up the wings when returning to tow mode. Once a tow boat is slowed down or stopped, the wings 310 become a hindrance to stabilizing the flying underwater imager 210 due to current, waves, and the like, continuing to apply force. The wings 310 can be constructed of a lightweight, strong material, such as carbon fiber. The wings 310 can be cropped-delta-shaped (i.e., roughly trapezoidal-shaped), and sized depending upon a tow angle of the wings 310. The pulley system can be powered by an electric motor 32 with spur gear 34 mounted on an output shaft of the electric motor 32. The two spur guars 36, 38 drive a corresponding pair of larger gears 40, 42. The larger gears 40, 42, are mounted on threaded shafts 44,46 that serve as worms and transfer power to gearing (not shown) within a casing 48 that drives a pair of opposite link bards 50, 52 to rotate, thus raising and lowering the wings 310.

The wings angle during tow, or angle of attack, is critical to operation. As a tow boat speeds up, downward force of negative buoyancy increases, pushing the flying underwater imager 210 deeper underwater. To the contrast, as the tow boat slows down, downward force decreases, giving ground to neutral buoyancy that can apply a lift force to the flying underwater imager 210. For example, the angle can be fixed between 10 and 20 degrees, such as being fixed at 18 degrees. The wings when folded may not be perfectly flush and may maintain, for example, an angle of 5 degrees. In another example that may be costlier and use more complex electro-mechanics, the angle of wings can be dynamically adjusted.

Other devices (not shown) can also be attached to a frame or a manifold of the flying underwater imager. For tow mode, an echo location system is attached to use sonar waves for mapping out long-range terrain. For free flying mode, an auto-pilot system having a closer range than the echo location system, even if using a similar technology, is attached.

One or more thrusters guide the flying underwater imager 210 with self-manifested movement rather than relying upon motion of the tow boat. The thrusters can be affixed on an underside of the flying underwater imager 210 as shown in FIG. 4B. The thrusters can comprise electrically-powered propellers, one at each of the four corners of the frame, and one oriented straight down, for instance. Sonar and thrusting systems are preferably located to prevent interference on the sonar as a result of the thrusting forces.

Sensors measuring depth, pressure, current, height above a sea bed (e.g., an altimeter), and the like, can be used for making position adjustments, as holding a position can require active thrusting. An underwater camera captures still images and video to stream to surface for display and recording. An onboard computer system responds to location coordinates generated by the echo location system when thrusting closer to that position for imaging.

Sonar imaging equipment is positioned on a frame along with a still camera and/or a video camera. The camera devices can be modified for underwater usage. Also, the camera devices can be purchased off the shelf or integrated into the other computer equipment. Off the shelf cameras can have internal processing, memory and communication.

FIGS. 4A-4B are various perspective views of the flying underwater imager in the free fly mode with wings folded, according to some embodiments.

Figure 5A:
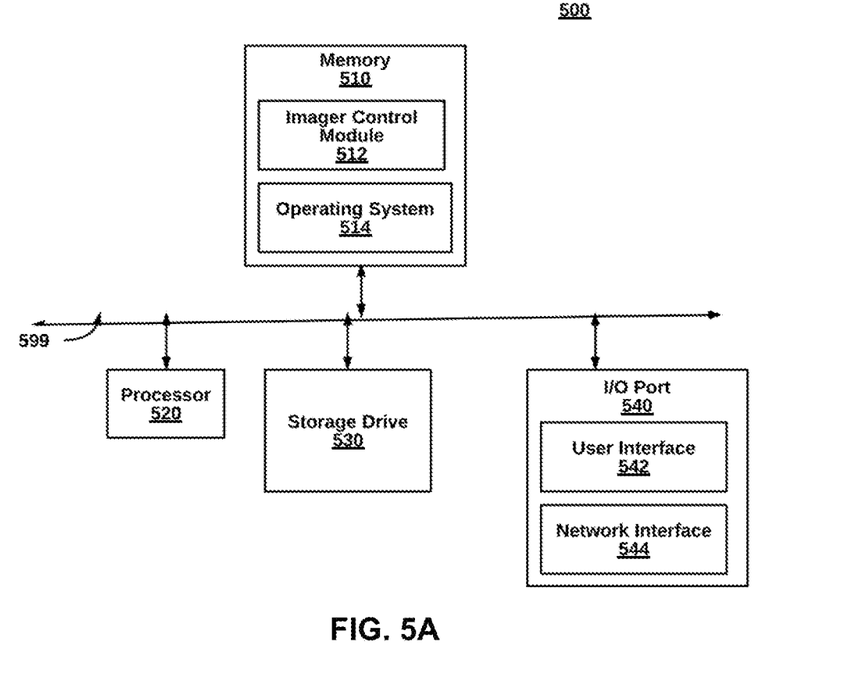
FIGS. 5A-5B are block diagrams illustrating a computing device of the flying underwater imager to locate and approach underwater objects for imaging, according to some embodiments.
Figure 5B:
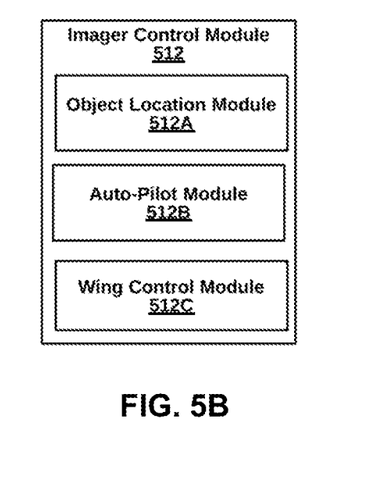

FIGS. 5A-5B are block diagrams illustrating a computing device of the flying underwater imager to locate and approach underwater objects for imaging, according to some embodiments. The computing device 500, of the present embodiment, includes a memory 510, a processor 520, a storage drive 530, and an I/O port 540. The components can be implemented in hardware, software, or a combination of both. Each of the components is coupled for electronic communication via a bus 599. Communication can be digital and/or analog, and use any suitable protocol. The computing device 500 can be a mobile computing device, a laptop device, a smartphone, a tablet device, a phablet device, a video game console, a personal computing device, a stationary computing device, a server blade, an Internet appliance, a virtual computing device, a distributed computing device, a cloud-based computing device, or any appropriate processor-driven device.

The memory 510 further comprises an imager control module 512 and an operating system 514. The imager control module 512, as further detailed in FIG. 5B, includes an object location module 512A to identify underwater objects along with location information with location hardware. A wing control module 512C draws wings from an unfolded position to a folded position, and vice versa, depending on the circumstances.

An auto-pilot module 512B uses the location information along with external force sensors to automatically travel towards a selected underwater object. In another embodiment, the auto-pilot module 512B automatically adjusts a depth of an underwater flying device. An updated depth can be received from an operator, a software process, over a network, or the like. In one example, a desired depth is increased, and in response, signals are sent to a tow control and/or a velocity control of a tow boat. The tow control can release and contract a town line. When released, a flying imaging device depth increases, and when contracted, the depth decreases. Similarly, the velocity control can speed up and slow down a towing device (either directly or indirectly through, e.g., a notification). When slowed down, a flying image device depth increases, and when sped up, the depth decreases. In another example, a water sample is taken from the desired depth. Advantageously, a boat can collect water samples from different depths on-the-fly, without stopping at each desired location.

In another embodiment of the auto-pilot module 512B, an altitude control automatically maintains or adjusts a height over a sea bed. The sea bed depth from a flying imaging device is a function of depth from a surface. Therefore, altitude can be expressed in terms of depth and vice versa. An altimeter, or other appropriate device, measures a height or altitude of a flying imaging device over a floor of the water. A minimum distance of, for example, 50 feet can be kept avoiding damage by a sea bed to the flying imaging device, by the auto-pilot module 512B. In another example, water quality samples can be taken at various heights above a sea bed by pumping water up to deck. In yet another example, a water quality sensor can measure characteristics of water quality and communicate with an altimeter in order to automatically provide monitoring results at various altitudes (or a depth sensor for monitoring various depths).

The operating system 514 can be one of the Microsoft Windows® family of operating systems (e.g., Windows 95, 98, Me, Windows NT, Windows 2000, Windows XP, Windows XP x64 Edition, Windows Vista, Windows CE, Windows Mobile, Windows 8 or Windows 5), Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

The processor 520 can be a network processor (e.g., optimized for IEEE 802.11), a general purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 520 can be single core, multiple core, or include more than one processing elements. The processor 520 can be disposed on silicon or any other suitable material. The processor 520 can receive and execute instructions and data stored in the memory 510 or the storage drive 530.

The storage drive 530 can be any non-volatile type of storage such as a magnetic disc, EEPROM, Flash, or the like. The storage drive 630 stores code and data for applications.

The I/O port 540 further comprises a user interface 542 and a network interface 544. The user interface 542 can output to a display device and receive input from, for example, a keyboard. The network interface 544 (e.g. RF antennae) connects to a medium such as Ethernet or Wi-Fi for data input and output.

Figure 6:
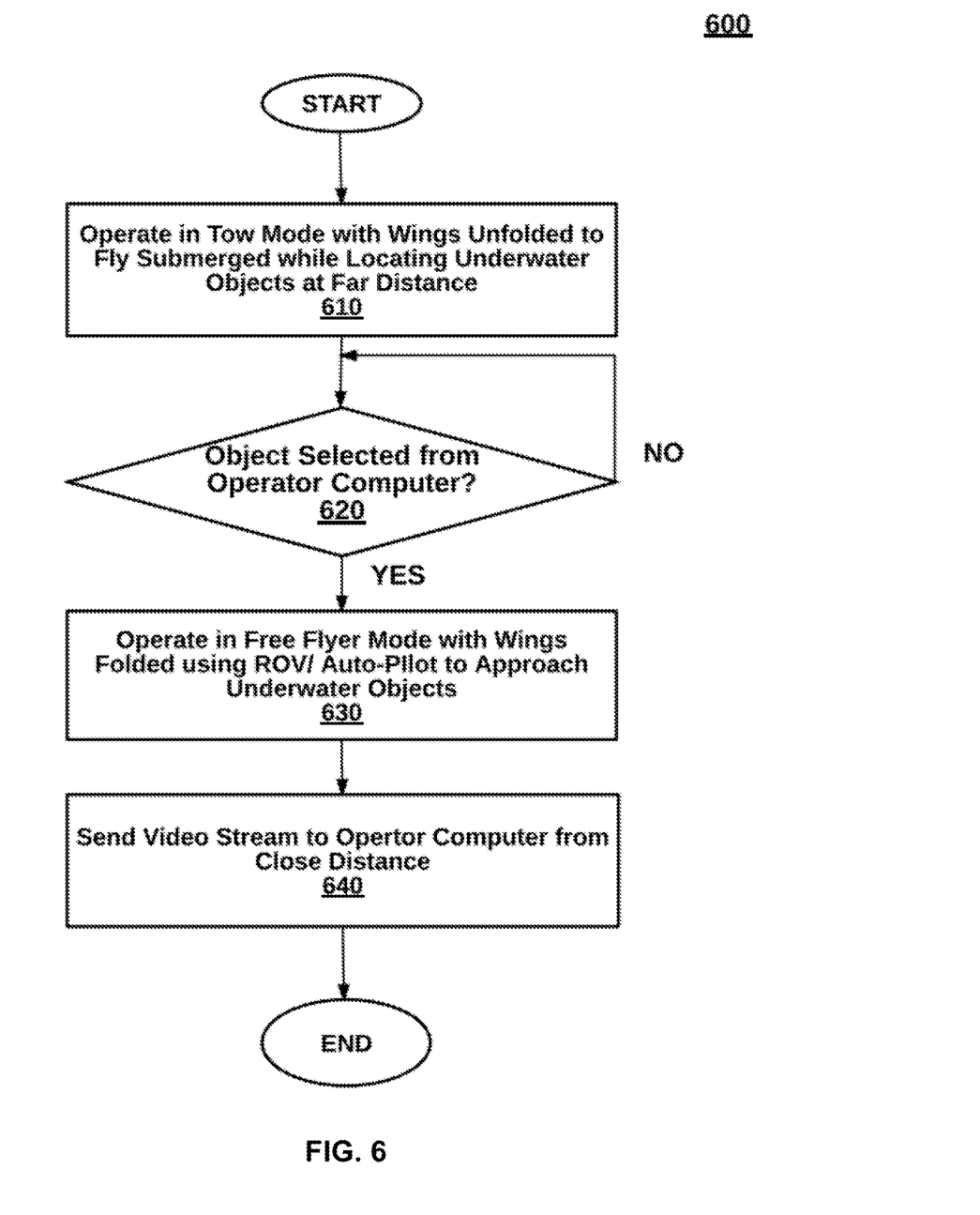
FIG. 6 is a flow chart illustrating a method for controlling multiple modes for locating and approaching underwater objects for imaging, according to an embodiment.

FIG. 6 is a flow chart illustrating a method 600 for controlling multiple modes for locating and approaching underwater objects for imaging, according to an embodiment. There can be more or fewer steps than shown in FIG. 6 and steps can be repeated or varied in order, as will be understood by one of ordinary skill in the art. The method 600 can be implemented by a flying underwater imager such as the flying underwater imager 210 as described above.

At step 610, an underwater flying imager operates in tow mode. As such, wings are unfolded to generate a depressing force for flying submerged while in tow. Meanwhile, an echo locator or other object identifying technique identifies underwater objects.

At step 620, responsive to an object selected from an operator computer, the flying underwater imager transitions from a first mode to a second mode. In the tow mode, object information is displayed on the operator computer as the seafloor is scanned. Low resolution imaging or digitally generated animation allows the operator to find objects of interest for further investigation. Rather than having to call back the first device and to deploy a second device, the flying underwater imager changes mode for investigation of the selected object.

At step 630, the flying underwater imager operates in free flying mode. The wings are drawn to a folded position to allow steering via auto-pilot or remote control form the operator.

At step 640, once the flying underwater imager is piloted to a close distance, one more images or a video stream is sent to the operator aboard the tow boat. Preferably, the video stream has a high resolution relative to the lower resolution of the locator during tow mode.

Other methods are possible. For example, a method maintains an altitude for a flying imaging device comprising the steps of: receiving an update to the desired depth; responsive to an increase in the desired depth, sending a signal to the tow controller to at least one of: release the tow line and decrease speed of the towing device; and responsive to a decrease in the desire depth, sending a signal to the tow controller to at least one of: contract the tow line and increase speed of the towing device.

In some embodiments, from a user perspective, an object is selected on a display from low resolution sonar images, and thereafter, high quality camera images or video appear on the display. The transparent back-end process is automated by computers for switching modes in the flying underwater imager for obtaining the high-quality images.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

I claim:

1. A flying underwater device with multi-mode operation for adjusting a flying depth, comprising:
   a frame with a hitch for connecting by a towing device;
   a pair of wings attached to the frame and controlled by a drive system; and
   a control module in a housing and communicatively coupled to the drive system, the control module including a tow controller to release and contract a tow line, and a speed controller to increase and decrease speed of the towing device;
   wherein in a tow mode, the drive system unfolds the pair of wings to a specific angle to maintain a desired depth as determined by downward pressure generated from a speed of towing and natural buoyancy of the flying underwater imaging device, and
   wherein the control module receives an update to the desired depth and responsive to an increase in the desired depth, sending a signal to the tow controller to at least one of: release the tow line and decrease speed of the towing device, and responsive to a decrease in the desire depth, sending a signal to the tow controller to at least one of: contract the tow line and increase speed of the towing device.

2. The flying underwater device of claim 1:
   wherein in a free fly mode, the drive system folds the pair of wings to permit deployment for remote operations and movement.

3. The flying underwater device of claim 1, wherein the towing device continually receives pumped water samples from a plurality of different depths.

4. The flying underwater device of claim 1, further comprising:
   a sonar transducer attached to the frame and communicatively coupled to the control module, the sonar transducer to locate underwater objects with echo location; and
   at least one thruster attached to the frame and communicatively coupled to the control module,
   wherein the control module comprises a location module and an auto-pilot module,
   wherein in the tow mode, the location module determines location coordinates of the at least one underwater object from data received from the sonar transducer, and
   wherein in the free fly mode, the auto-pilot module activates the at least one thruster to position the flying underwater imaging device proximate to the at least one underwater object.

5. The flying underwater device of claim 1, wherein, in a tow mode, the towing device connects to the hitch and, in a deployment mode, the towing device disconnects from the hitch.

6. The flying underwater device of claim 1, further comprising:
   a data line connected to the housing to transfer commands from a remotely located computer to the control module, wherein at least one command switches from the tow mode to the free fly mode that is executed to disconnect the hitch from the towing device.

7. The flying underwater device of claim 1, further comprising:
   a data line connected to the housing to transfer commands from a remotely located computer display to the control module, wherein at least one command sends a selection of an underwater object to approach in the free fly mode.

8. The flying underwater device of claim 1, further comprising:
   an image camera attached to the frame, the image camera to capture an image or a video of at least one underwater object.

* * * * *